United States Patent [19]

Gramling

[11] Patent Number: 5,289,256
[45] Date of Patent: Feb. 22, 1994

[54] INTEGRATED-OPTICS EXPANSION INTERFEROMETER IN AN EXTENSION-METROLOGICAL NEUTRAL ENVIRONMENT

[75] Inventor: Hubert Gramling, Ebersbach, Fed. Rep. of Germany

[73] Assignee: Daimler-Benz AG, Fed. Rep. of Germany

[21] Appl. No.: 9,036

[22] Filed: Jan. 26, 1993

[30] Foreign Application Priority Data

Feb. 15, 1992 [DE] Fed. Rep. of Germany ....... 4204521

[51] Int. Cl.⁵ .............................................. G01B 9/02
[52] U.S. Cl. .................. 356/345; 356/35.5; 385/12; 250/227.19
[58] Field of Search ............... 356/355, 345, 352, 357, 356/350; 250/227.19, 227.27; 385/12, 14; 73/517 B

[56] References Cited

U.S. PATENT DOCUMENTS

| | | | |
|---|---|---|---|
| 4,515,430 | 5/1985 | Johnson | 385/14 |
| 4,627,728 | 12/1986 | Wilson | 250/220.19 |
| 4,865,453 | 9/1989 | Gidon et al. | 356/358 |
| 4,941,744 | 7/1990 | Yokokura et al. | 356/358 |
| 5,173,747 | 12/1992 | Boarski et al. | 356/361 |

FOREIGN PATENT DOCUMENTS

| | | |
|---|---|---|
| 3825606 | 4/1990 | Fed. Rep. of Germany . |
| 4103914 | 8/1991 | Fed. Rep. of Germany . |
| WO91/12487 | 8/1991 | World Int. Prop. O. . |

OTHER PUBLICATIONS

*tm-Technisches Messen* 58 (1991), No. 4, pp. 152-157, R. Fuest, "Integrated-Optics Michelson Interferometer with Quadrature Demodulation in Glass for the Measurement of Displacement Paths".
*tm-Technisches Messen* 58 (1991), No. 4, pp. 146-151, G. Ulbers, "Integrated-Optics Silicon-Based Sensors for Path, Force and Refractive Index Measurement".
*Feinwerk-technik & Messtechnik* 97 (1989), No. 10, pp. 415-421, K. Grosskopf, "Use of Glass for Integrated Optics".

Primary Examiner—Samuel A. Turner
Assistant Examiner—Robert Kim
Attorney, Agent, or Firm—Evenson, McKeown, Edwards & Lenahan

[57] ABSTRACT

An integrated-optics extension interferometer, in which the measuring and reference arm, the beam splitter and the beam coupler as well as entrances and exits for primary light and interference light are integrated in the baseplate, can be applied in the manner of a wire strain gauge to components to be investigated. The portions of the waveguide which form the measuring and reference arm are integrated over their entire length in the baseplate, and are disposed in a plurality of loops with mutually parallel oriented straight active partial sections and intermediate deflecting sections, in which a coupling free mutual minimum spacing of all straight active partial sections and deflecting sections of the integrated waveguides forming the measuring and reference arm respectively is observed at all locations. As a result of this, the fundamental interferometer can be applied to the surface of stressed workpieces in a manner which is as simple and space-saving as a conventional electrical-resistance wire strain gauge for extension measurements. In order to achieve an automatic compensation of the extension due to temperature, the reference arm is also expediently wound in the manner of loops and is designed to be of the same length as the measuring arm, but is disposed in an extension-metrologically neutral manner. An integrated-optics extension interferometers of double-beam construction according to Michelson or according to Mach-Zehnder and those of so-called multibeam construction according to Fabry-Perot are possible.

24 Claims, 3 Drawing Sheets

INTEGRATED-OPTICS EXPANSION INTERFEROMETER IN AN EXTENSION-METROLOGICAL NEUTRAL ENVIRONMENT

BACKGROUND AND SUMMARY OF THE INVENTION

The invention relates to an interferometer and, more particularly, to an interferometer constructed using integrated-optics technology. The interferometer includes a baseplate with waveguides integrated therein. A portion of the integrated waveguides, i.e., the entrance portion, is passed to the edge of the baseplate and is there connected in a light-conducting manner to an entrance optical fiber supplying primary light from a laser light source. A further portion of 10 the integrated waveguides, i.e., the exit portion, is likewise passed to the edge of the baseplate and is there connected in a light-conducting manner to an exit optical fiber conducting interference light away to a detecting device. The interferometer further has an integrated light-splitting device, disposed downstream of the entrance portion of the integrated waveguide, to split up the injected primary light onto a reference arm and onto a measuring arm of waveguides. That portion of the waveguide which forms the reference arm is integrated over its entire length in the baseplate. An integrated light coupler combines the light from the reference arm and that from the measuring arm and merges into the exit portion.

Such an interferometer is disclosed, for example, in an article in the German periodical: *tm-Technisches Messen* 58 (1991), No. 4, pages 152 to 157, R. Fuest, "Integrated-optics Michelson interferometer with quadrature demodulation in glass for the measurement of displacement paths". What is designated in this case, for reasons of clarity, as a baseplate is in most cases designated as a "substrate" in the scientific literature. As regards the physical form of the base carrying the waveguides, this does not indicate any concept, which is why the term "baseplate" is preferred here.

In the interferometer known from the above cited literature reference, only the reference arm is integrated in the baseplate, whereas the measuring arm is integrated in the baseplate only to the extent of a proportion which is small and above all metrologically passive. In specific terms, the integrated part of the measuring arm is passed to the edge of the baseplate, where it is injected via a small lens into a measuring section which is situated outside the baseplate and at the end of which a reflector is disposed. The displacement path is to be determined by interferometry. Accordingly, this literature reference describes a free beam interferometer of the Michelson type of integrated optics miniature construction. This literature reference also describes integrated-optics structures of waveguides for the generation of phase-shifted interference signals, with which not only does the direction of movement, i.e., movement towards or away, become discernible, but also a higher degree of measurement resolution becomes attainable. One of the waveguide structures described here is the so-called 3×3 directional coupler, with which three interference signals with a phase shift of preferably 120° in each instance can be generated. This literature reference does not discuss the question of a specific metrological application of the miniaturized free-beam interferometer. Furthermore, that is not the intention of this article. Reference is only made to measurements of displacement of the component carrying the reflector at the end of the measuring arm. In addition to the miniature construction, emphasis is placed, inter alia, on the disturbance protection in relation to electromagnetic fields by way of advantage.

Another article in the same periodical *tm-Technisches Messen* 58 (1991), No. 4, pages 146 to 151, by G. Ulbers, "Integrated-optics silicon-based sensors for path, force and refractive index measurement", in which miniaturized free-beam interferometers of the Michelson type are also described, mentions various metrological practical applications of such sensors. In one of the cases of application which are presented, the extension is measured by interferometry on a tension specimen which is clamped into a material testing machine and is increasingly subjected to tension and extended. In specific terms, spherical reflectors projecting transversely from the specimen are fitted to the two ends of the tension specimen. The reflectors reflect an interferometer measuring beam injected parallel to the specimen axis from the end surfaces again parallel to the end-surface interferometers. The interferometers themselves are not fitted to the tension specimen, but so as to be stationary on the machine frame of the material testing machine. It is emphasized that the interferometric extension measurement brings the advantage of a non-contact measurement and a high resolution, as compared with conventional extension measuring methods. A disadvantage of the known type of interferometric extension measurement is the very awkward application, which is very bulky as compared with the electrical-resistance extension measurement using wire strain gauges.

A further article in the periodical *Feinwerk-technik & Meβtechnik* 97 (1989), No. 10, pages 415 to 421, by K. Groβkopf, "Use of glass for integrated optics", shows diagrammatically, inter alia, an interferometer according to the Mach-Zehnder type, which is fully integrated, i.e. integrated into a baseplate both with the measuring arm and also with the reference arm, but in which both rectilinearly-designed interferometer arms extend parallel side by side in the baseplate. If the optical conditions are altered by a quantity to be measured in one of the parallel interferometer arms in comparison with the reference arm, then the interference pattern in the exit channel is altered. This permits the derivation, following optoelectronic evaluation, of a measurement value, for example, for substance concentration or magnetic fields in the surrounding medium. No thought is given to an application of this interferometer for extension measurements, nor is such application possible.

There is therefore needed an interferometer which can be used in a manner which is just as simple and space-saving as a conventional electrical-resistance wire strain gauge.

According to the present invention, this need is met on a two-fold basis, namely on the one hand by a double-beam interferometer according to Michelson or according to Mach-Zehnder and on the other hand by a single-beam interferometer according to Fabry-Perot. The double-beam interferometer includes a baseplate with waveguides integrated therein. A portion of the integrated waveguides, i.e., the entrance portion, is passed to the edge of the baseplate and is there connected in a light-conducting manner to an entrance optical fiber supplying primary light from a laser light source. A further portion of the integrated waveguides, i.e., the exit portion, is likewise passed to the edge of the baseplate and is there connected in a light-conducting manner to an exit optical fiber conducting interference light away to a detecting device. The interferometer further has an integrated light-splitting device, disposed downstream of the entrance portion of the integrated waveguide, to split up the injected primary light onto a reference arm and onto a measuring arm of waveguides. That portion of the waveguide which forms the reference arm is integrated over its entire length in the baseplate. An integrated light coupler combines the light from the reference arm and that from the measuring arm and merges into the exit portion. Both that portion of the waveguide which forms the reference arm and also that portion of the waveguide which forms the measuring arm are in each instance integrated over their entire length in the baseplate. At least that portion of the waveguide which forms the measuring arm is disposed in a plurality of loops with mutually parallel oriented straight active partial sections and intermediate deflecting sections, in which a coupling-free mutual minimum spacing of all straight active partial sections and deflecting sections of the integrated waveguide forming the measuring arm is observed at all locations. The waveguide forming the reference arm is designed in such a manner and/or is disposed in the baseplate in such a manner that upon extension of the baseplate in the direction of the active partial sections of the measuring arm, the reference arm behaves in an extension-metrologically neutral manner.

The interferometer of the Fabry-Perot type is constructed using integrated optics technology. It comprises a baseplate with waveguides integrated therein. A portion of the integrated waveguides, i.e., the entrance portion, extends to the edge of the baseplate and is there connected in a light-conducting manner to an entrance optical fiber supplying primary light from a laser light source and a further portion of the integrated waveguides, i.e., the exit portion, likewise extends to the edge of the baseplate and is there connected in a light-conducting manner to an exit optical fiber conducting interference light away to a detecting device. The interferometer further has a Y-shaped combining element combining the entrance portion and the exit portion into a common waveguide. Downstream of the common waveguide of the combining element, there is optically disposed a resonator. The resonator is formed from a partially transmitting mirror, which is integrated into the baseplate and which stands orthogonally to the waveguide. An integrated resonator waveguide and an end mirror are disposed at the other end of the resonator waveguide. The resonator waveguide is disposed in a plurality of loops with mutually parallel oriented straight active partial sections and intermediate deflecting sections, in which a coupling-free mutual minimum spacing of all straight active partial sections and deflecting sections of the integrated waveguide forming the resonator is observed at all locations.

By virtue of the full integration of both interferometer arms into the baseplate of the integrated-optics double-beam interferometer and of the extension-metrologically neutral design or arrangement of the reference arm therein on the one hand and, by virtue of the multiple loop-type course at least of the measuring arm in the baseplate, the interferometer according to the present invention is not only made quite considerably smaller and simplified as compared with the known free-beam design, but also its application to components to be stressed becomes, in principle, just as simple as that of an electrical resistance wire strain gauge. It is amazing that the integrated waveguides can be integrated into the base plate with relatively tight curvature and also with a mutually crossing course, with low loss. The double-beam interferometer can, as stated, be designed as a Michelson interferometer or as a Mach-Zehnder interferometer. The Fabry-Perot extension interferometer functions in a similar manner. However, with respect to its advantages it behaves in principle on an equivalent basis.

In order to achieve an automatic compensation of the extension due to temperature, in the case of the double-beam interferometer, the reference arm is also expediently wound in the manner of loops and is designed to be of the same length as the measuring arm and in this case is of course disposed in an extension-metrologically neutral manner. A comparable design for a single-beam interferometer is also disclosed.

Other objects, advantages and novel features of the present invention will become apparent from the following detailed description of the invention when considered in conjunction with the accompanying drawings.

DETAILED DESCRIPTION OF THE INVENTION

Figure 1:
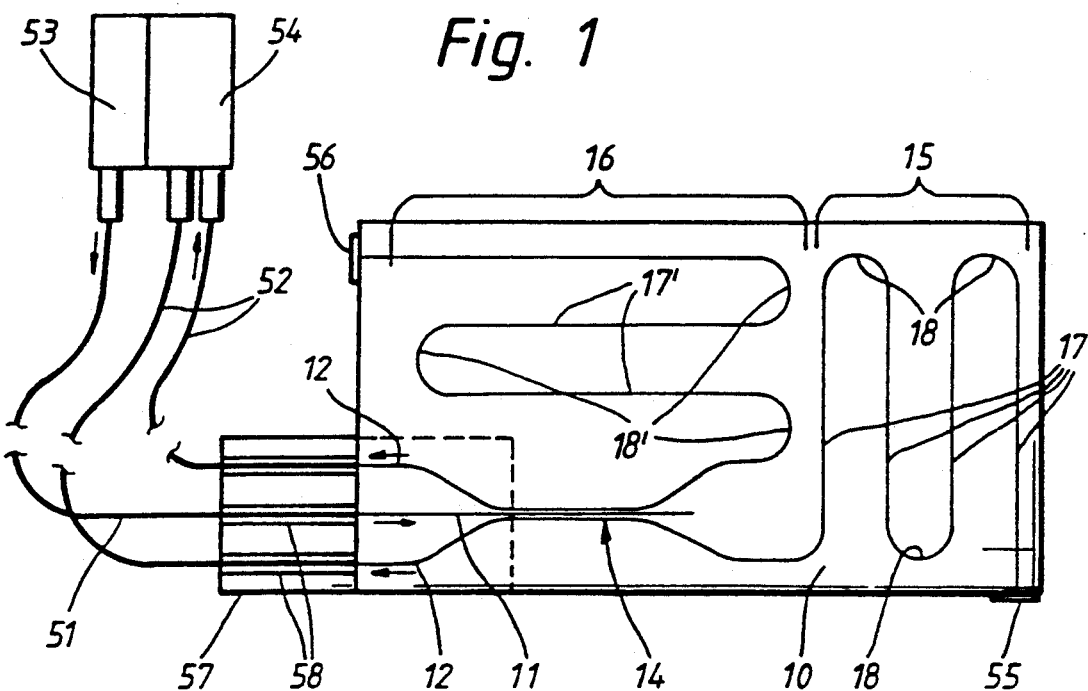
FIG. 1 is a first illustrative embodiment of an integrated-optics extension interferometer according to the Michelson type showing the connection of the entrance and exit optical fibers, respectively, from a laser light source and to a detecting device respectively.

Before details are given concerning the various integrated-optics extension interferometers shown in the figures in succession, details will first be given concerning a number of general features or aspects of the double-beam variants shown. The integrated-optics extension interferometers include, as a quite essential component, a baseplate 10, 20, 30 or 40, into which defined patterns of waveguides are integrated. The processes required in this connection are assumed here to be known. The material of the baseplate is preferably a glass. However, it may also be a silicon plate, on which a silicon oxide layer, i.e. a quartz layer, is formed, into which in turn the waveguides are then integrated. Electrical semiconductor elements could then be integrated into the silicon layer. Furthermore, baseplates comprising transparent polymers or semiconductor materials are feasible. Specifically, the baseplates comprising non-polymeric material permit only a relatively small maximum extension of the order of magnitude of approximately $5 \cdot 10^{-4}$ and above but, in view of the fact that with the integrated-optics extension interferometers according to the invention extensions down to $10^{-8}$ are definitely detectable, this is not a disadvantage, since in all cases an extension measurement range of barely four powers of ten can still be used. Baseplates comprising polymeric materials permit a substantially higher extension, which may be above the limiting extension of the majority of component materials to be examined.

Using the waveguides integrated into the base plate, an interferometer is constructed. To this end, an entrance portion 11, 21, 31 or 41 of a waveguide is passed approximately orthogonally to the edge of the baseplate and is there connected in a light-conducting manner to an entrance optical fiber 51. Furthermore, exit portions 12, 22, 32 or 42 of integrated waveguides are likewise passed to the edge of the baseplate and are there connected in a light-conducting manner to exit optical fibers 52. The entrance optical fiber 51 transmits laser light from a laser light source 53. The exit optical fibers 52 transmit interference light from the exit portions to a detecting device 54. In order to be able to couple the optical fibers 51 and 52 respectively, not only optically but also mechanically reliably to the baseplate, a connecting plate 57 is cemented onto the baseplate at the lower surface, which is provided with V-shaped grooves 58, into which the optical fibers 51 and 52 can in turn be laid and cemented. As a result of this, they acquire a mechanically loadable hold. The end surface of the optical fibers is cemented on coaxially to the ends of the entrance and exit portions respectively, in a light-conducting manner.

In order to construct an interferometer integrated into the baseplate, the injected light must be split up onto two different paths, namely a measuring arm 15, 25, 35 or 45 on the one hand and a reference arm 16, 26, 36 or 46 on the other hand, for which purpose appropriate light-splitting devices are fitted in the various modified embodiments. The light emerging again from the measuring arm and from the reference arm must be brought to interference, for which purpose appropriate coupling devices are integrated into the baseplate. The interference light is finally further transmitted into the exit optical fibers to the detecting device.

A common feature of all integrated-optics extension interferometers using the double-beam type of construction is that not only the reference arm of the interferometer, but especially the measuring arm is integrated over its entire length in the baseplate and is disposed in a plurality of loops with mutually parallel oriented straight active partial sections and intermediate deflecting sections, in which a coupling-free mutual minimum spacing of all straight active partial sections and deflecting sections of the integrated waveguide forming the measuring arm is observed at all locations.

When using an integrated-optics extension interferometer formed in such a manner, the baseplate is applied to the surface of a mechanically stressed work piece at a position of particular interest in the manner of a conventional, electrical-resistance wire strain gauge in such a manner that the straight active partial sections of the measuring arm lie parallel to the direction of stress and are extended or compressed in a manner corresponding to the component stress. This surface extension or compression can be measured by interferometry. In this case, a very high resolution of the extension measurement can be achieved, so that the component needs to be stressed only relatively slightly. Extensions of the order of magnitude of $10-8$ can still be reliably detected. A further advantage of the interferometric extension measurement resides in the insensitivity to disturbing electromagnetic radiations.

Naturally, the measurement sensitivity of the integrated-optics extension interferometer becomes all the greater, the greater the overall length of recti linear active partial sections which can be accommodated within the loops of the measuring arm on the baseplate. It would accordingly be feasible to use the available surface of the baseplate as fully as possible for the accommodation of loops of the measuring arm and to give to the reference arm a length of zero as far as possible, as is customary in the case of free-beam interferometers. Any possible extensions of the workpiece due purely to temperature would, with such a design, then however have to be compensated arithmetically by a temperature measurement.

In order to be able to dispense with such a progressive temperature measurement and arithmetic compensation of temperature extension, it is more expedient also to dispose the reference arm 16, 26, 36 or 46 in a plurality of loops with mutually parallel oriented straight active partial sections 17', 27', 37', 47' and intermediate deflecting sections in a length conforming to the length of the measuring arm 15, 25, 35, 45. In this case, however, the straight active partial sections of the reference arm must be disposed in a direction behaving in an extension-metrologically neutral manner in relation to the direction of the straight active partial sections of the measuring arm, preferably orthogonally to them in the baseplate. Naturally, a coupling-free mutual minimum spacing of the straight active partial sections and deflecting sections of the integrated waveguide forming the reference arm in relation to one another and in relation to the waveguides of the measuring arm must also be observed at all locations. In the case of all represented illustrative embodiments of integrated-optics extension interferometers, this expedient design with equally long measuring and reference arms respectively, which are disposed transversely to one another, is provided. For the space-saving accommodation of the loops of the measuring arm and of the reference arm respectively, the integrated waveguides might cross over without further ado. As a result of this, a relatively great length of both the measuring arm and also of the reference arm can also be accommodated on a relatively small surface of the baseplate.

Figure 2:
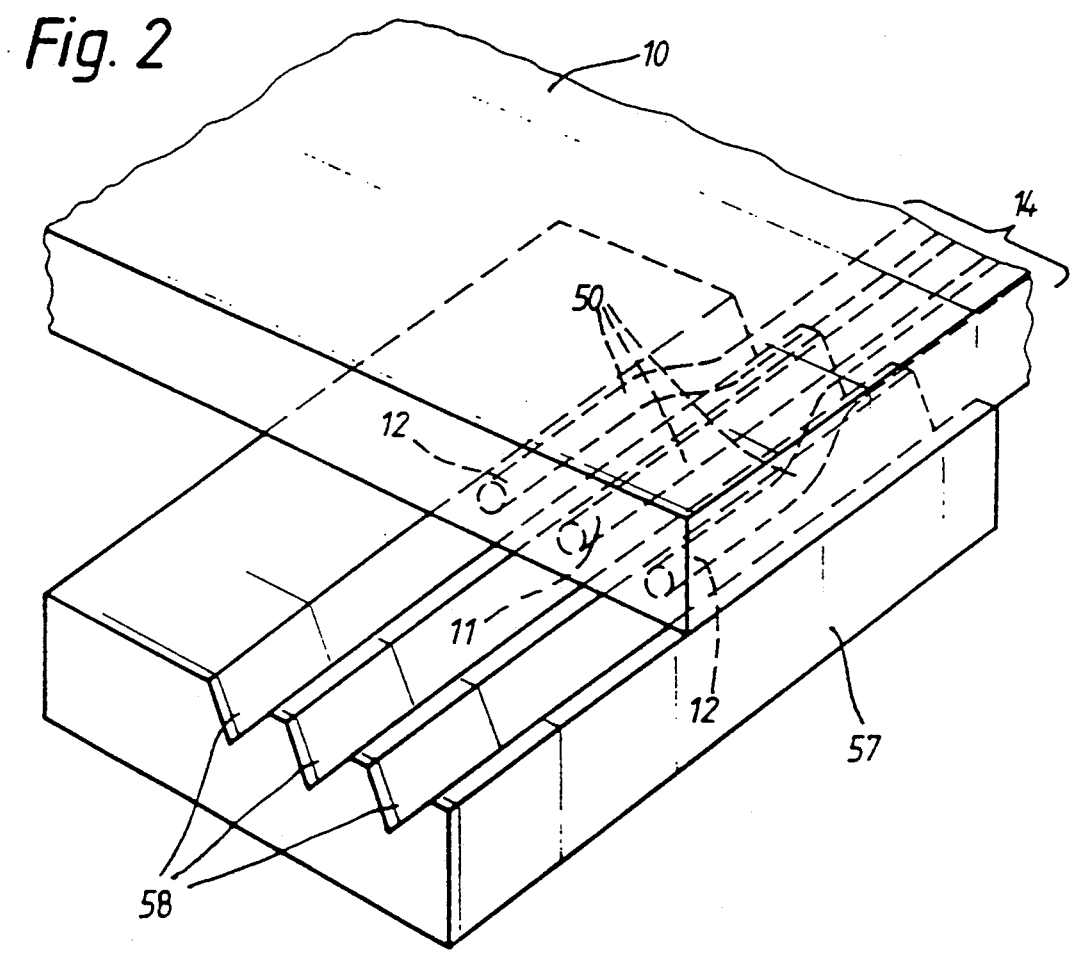
FIG. 2 is a perspective representation of the connection of the entrance and exit optical fibers respectively, to the baseplate according to FIG. 1 forming the integrated-optics extension interferometer.

The integrated-optics extension interferometer shown in FIG. 1 or FIG. 2, but therein only in the form of a section, is designed as a Michelson interferometer. The light-splitting device and the light coupler are - as is usual in Michelson interferometers—structurally combined in a single waveguide configuration, and specifically in the illustrative embodiment shown in a so-called $3 \times 3$ directional coupler 14 known per se. Such a directional coupler exhibits three waveguides 50 passed side by side at coupling spacing over a defined length in which the central, blunt-ended waveguide of the directional coupler represents the entrance portion 11 and the two other waveguides merge on the one hand into the measuring arm 15 or into the reference arm 16 and on the other hand merge into the exit portions 12. At the two exit portions 12, two interference signals which are displaced in phase by a defined fraction of a period are present. Preferably, with three exit portions, the aim is to achieve a 120° shift. This can be achieved by appropriate dimensioning of the magnitude of the coupling spacing and/or of the transit length of the waveguides extending side-by-side at the mutual coupling spacing. In this manner, which is selected in dependence upon the number of exit portions according to expediency aspects, it is also possible to implement any selectable other phase shift, for example, a mutual 90° shift. At the free ends of the measuring arm 15 and the reference arm 16, there is fitted a measuring reflector 55 and a reference reflector 56 respectively, standing transversely to the waveguide, for which purpose the finely processed outer edge of the baseplate can be used.

In the design of the loops of the measuring arm 15 and the reference arm 16 which is selected in FIG. 1, a plurality of rectilinear active partial sections 17 and respectively, are provided within the measuring arm 17' and within the reference arm. These sections 17, 17' merge in each instance through semicircular arc sections 18 and 18' respectively, into one another. The loops are disposed in the manner of a meandering path without mutual approach or overlap. The active partial sections 17' of the reference arm 16 are, as stated, disposed orthogonally to the corresponding active partial sections 17 of the measuring arm 15. In the application of the extension interferometer, it thus has to be ensured that the active partial sections 17 of the measuring arm 15 lie parallel to the component stress which is to be measured.

Figure 3:
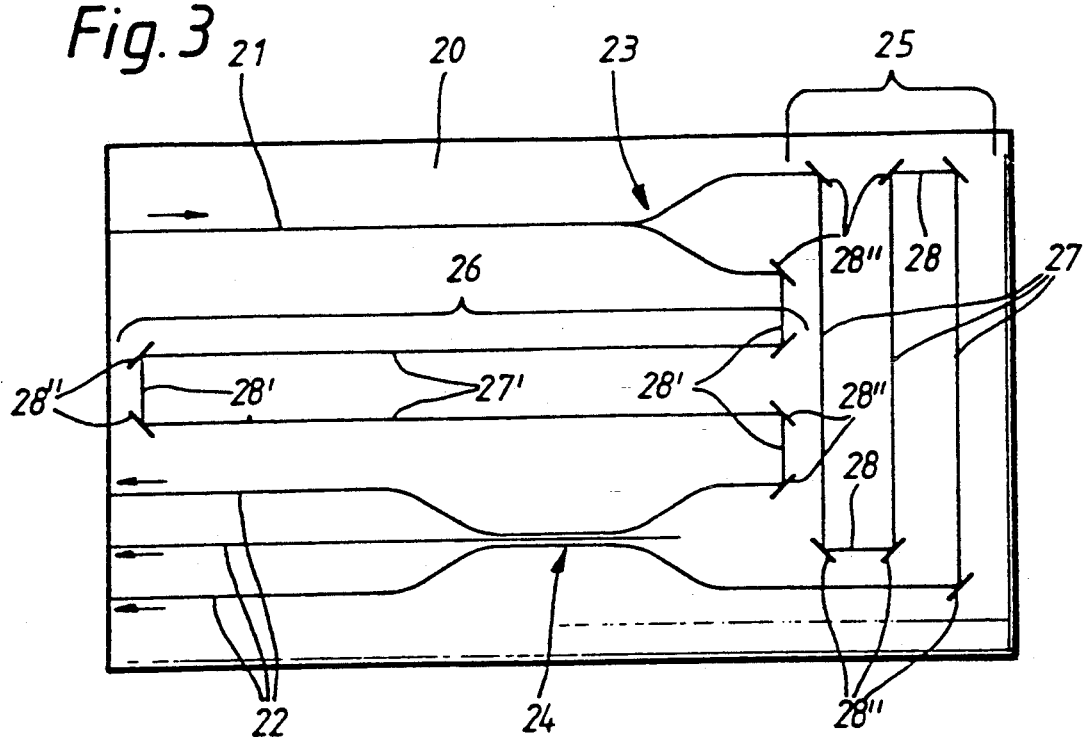
FIG. 3 is a further illustrative embodiment of an integrated-optics extension interferometer according to the Mach-Zehnder type with reflective deflection of the wave fronts in the waveguide loops of the measuring arm and reference arm respectively.
Figure 4:
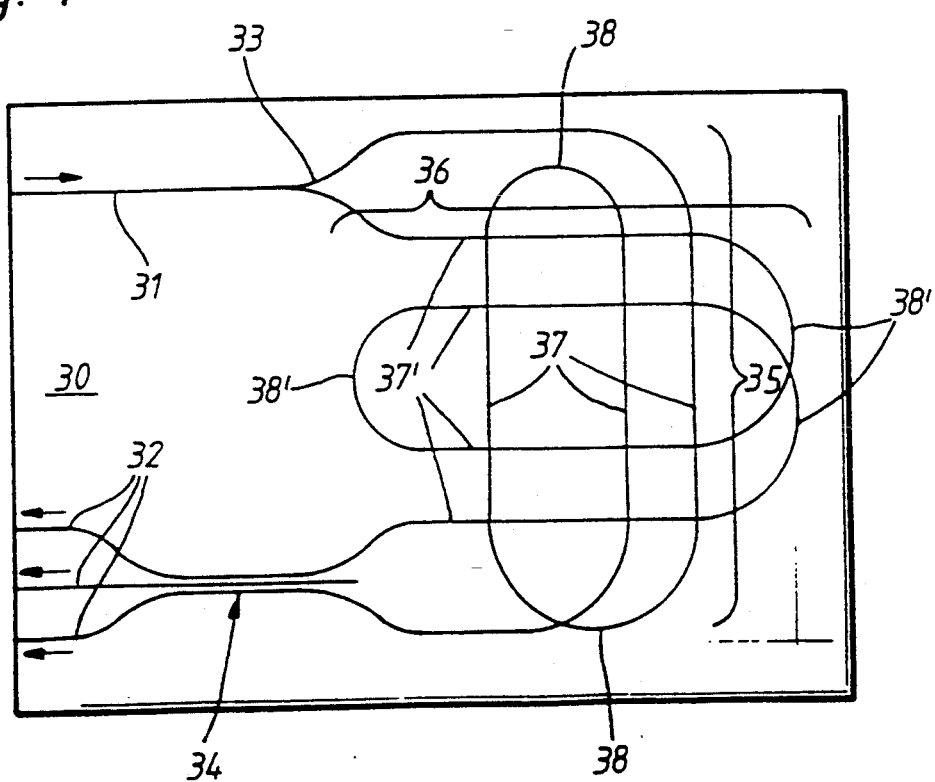
FIG. 4 is a third illustrative embodiment of an integrated-optics extension interferometer according to the Mach-Zehnder type with mutually crossing waveguide loops passed in an arc shape at the reversal positions in the measuring and reference arm respectively.
Figure 5:
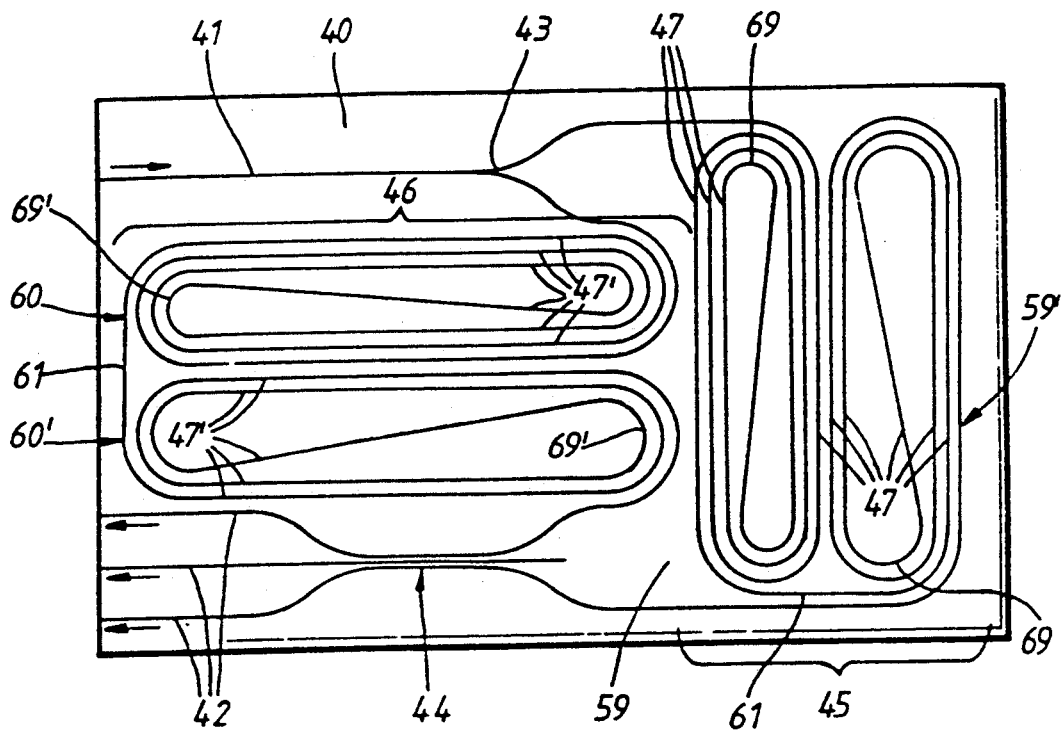
FIG. 5 is a fourth illustrative embodiment of an integrated-optics extension interferometer according to the Mach-Zehnder type with waveguide loops passed in oval double spirals in the measuring and reference arm respectively.

The illustrative embodiments of integrated-optics extension interferometers shown in FIGS. 3, 4 and 5 are designed as Mach-Zehnder interferometers. Accordingly, they exhibit a device for interference formation, which device is separate from the light-splitting device designed as a so-called Y divider. The measuring arm and the reference arm are in each instance traversed only once and in one direction. As a result of this, the resolution is indeed not as great as in the case of the Michelson interferometer with a two-fold traverse of the laser light through the measuring arm and through the reference arm, but the Mach-Zehnder interferometer offers the advantage that no light is coupled back from the interferometer arms into the laser light source. This can lead to the impairment of the spectral properties of the laser. To the entrance portion 21, 31 or 41 of the extension interferometers of FIGS. 3, 4 and 5, there is connected an integrated light-splitting device in the form of a branching 23, 33 or 43 (frequently also referred to as a Y divider) in which one of the two branching-off waveguides merges into the measuring arm 25 35 or 45 and the other branching-off waveguide merges into the reference arm 26, 36 or 46.

The light coupler combining the light from the measuring arm and from the reference arm is also designed in the form of a 3×3 directional coupler 24, 34 or 44 in the illustrative embodiments shown here. In this case, however, other structures are known and applicable in this regard. Even in the case of the 3×3 directional coupler found to be particularly expedient and shown in the examples, three waveguides passed side by side at coupling spacing over a defined length are combined, in which the central, blunt-ended waveguide of the 3×3 directional coupler represents one of three exit portions 22, 32 or 42 and the two other waveguides, situated on the outside, of the 3×3 directional coupler merge on the one hand into the measuring arm or into the reference arm and on the other hand merge into further exit portions. In total, at the three exit portions 22 (FIG. 3) or 32 (FIG. 4) or 42 (FIG. 5), three interference signals which are phase-shifted by preferably 120° are present which offer the advantage of an exact directional recognition of the length alteration of the measuring arm as an extension or as a compression.

In the illustrative embodiment of an integrated optics extension interferometer shown in FIG. 3, the loops of the measuring arm 25 or of the reference arm 26 are likewise disposed in a meandering path configuration without mutual overlap or approach. To this extent, this illustrative embodiment is designed in a similar manner to that according to FIG. 1. However, in contrast to FIG. 1, in the interferometer according to FIG. 3, the deflecting sections between two successively following straight active partial sections 27 or 27' within the measuring arm or the reference arm are formed by a connecting piece which extends rectilinearly and which adjoins orthogonally with a sharp edge onto the respective active partial sections and by a deflecting mirror, which is disposed at each corner of waveguide sections. In specific terms, the deflecting mirror is formed by the totally reflecting lateral surface of a slot 28" incorporated into the baseplate 20 perpendicularly to the glass surface. The slot is disposed in the region of the corner of the waveguide sections at a 45° angle to the combining active partial sections 27 or 27' on the one hand and the connecting sections 28 or 28' on the other hand. In view of the fact that the individual slots 28" must be applied with very great accuracy in relation to the position of the waveguide sections and in view of the fact that the application of the many slots 28" must take place, for example, by reactive ion etching in a further, costly masking step, the possible design of the deflecting sections between the rectilinear active partial sections of waveguides is presented merely as an alternative which is indeed feasible. In the practical case, preference will certainly be given to the mirror-free, circular arc-shaped deflection according to the other illustrative embodiments shown. At this point, it should merely further be mentioned that in place of a semicircular deflection, a deflection by means of two quadrant arcs may also take place.

In the embodiments according to FIGS. 1 and 3, an overlap of the waveguides within the loops of the measuring arm or of the reference arm has been avoided. However, as stated, this is not absolutely necessary. In the illustrative embodiment shown in FIG. 4, different types of overlaps of waveguides are provided. This is entirely permissible. Indeed, as a result of a relatively large number of such overlaps, a certain loss of light intensity may arise, but such a loss can as a rule be tolerated without further ado with a correspondingly large exit intensity of the primary light. In spite of such a loss, in all cases it is still possible to generate interference signals which are sharply defined and reliably countable. On the one hand, the waveguides overlap, in the interferometer according to FIG. 4, in the region of the arc section 38 and 38'. In this case, an acute angled overlap is unavoidable. Even such an overlap is permissible without further ado, as long as the angles do not become too small. Overlaps with a very looping cross-section should however be avoided.

A further overlap of waveguides takes place, in the illustrative embodiment according to FIG. 4, in that the loops of the measuring arm 35 cross over the loops of the reference arm 36, so that the active partial sections 37 of the measuring arm cross the active partial sections 37' of the reference arm at right angles. Naturally, the representation according to FIG. 4 is greatly simplified. Expediently, in a specific construction, the individual waveguides will be disposed in a substantially tighter sequence and in a larger number, so that a relatively great total length of rectilinear active partial sections within the loops on the baseplate can be accommodated. The design according to FIG. 4 would lead, with a very large number of active partial sections 37 or 37', to a correspondingly large number of crossover positions.

In order not only to keep the number of crossover positions of waveguides small when using a large number of active partial sections, but also to avoid such crossover positions entirely where possible, according to FIG. 5 the loops of the measuring arm 45 and/or those of the reference arm 46 are disposed in the form of at least one oval double spiral 59 and 59'—for the measuring arm—or 60, 60'—for the reference arm. An oval spiral is wound, as it were, from a waveguide section extending to and fro in a U shape and the parallel limb sections of which merge into one another via an end loop 69, 69'. In this case, a waveguide partial section 61 or 61' is passed from the outermost active partial section 47 or 47' of the one double spiral without crossover to the adjacent double spiral. Naturally, in a practically constructed illustrative embodiment substantially more windings can be disposed within an oval spiral and also substantially more spirals can be disposed side by side, so that in total a very large overall length of rectilinear active partial sections of waveguides can be accommodated within the oval double spirals.

In view of the fact that the wave guides can be disposed at a mutual transverse spacing of approximately 50 to 150 μm side by side, without the lightwaves propagating in the waveguides coupling onto one another, and in view of the fact that radii of curvature of approximately the same order of magnitude can be formed at the reversal positions of the waveguides, it is clear that even on small baseplates with appropriately close "packing" of waveguides, relatively great total lengths of rectilinear active partial sections of the waveguides can be accommodated. A cumulative total length of the active partial sections of approximately 50 cm on a surface area of the baseplate of approximately 1 cm² is feasible.

Figure 6:
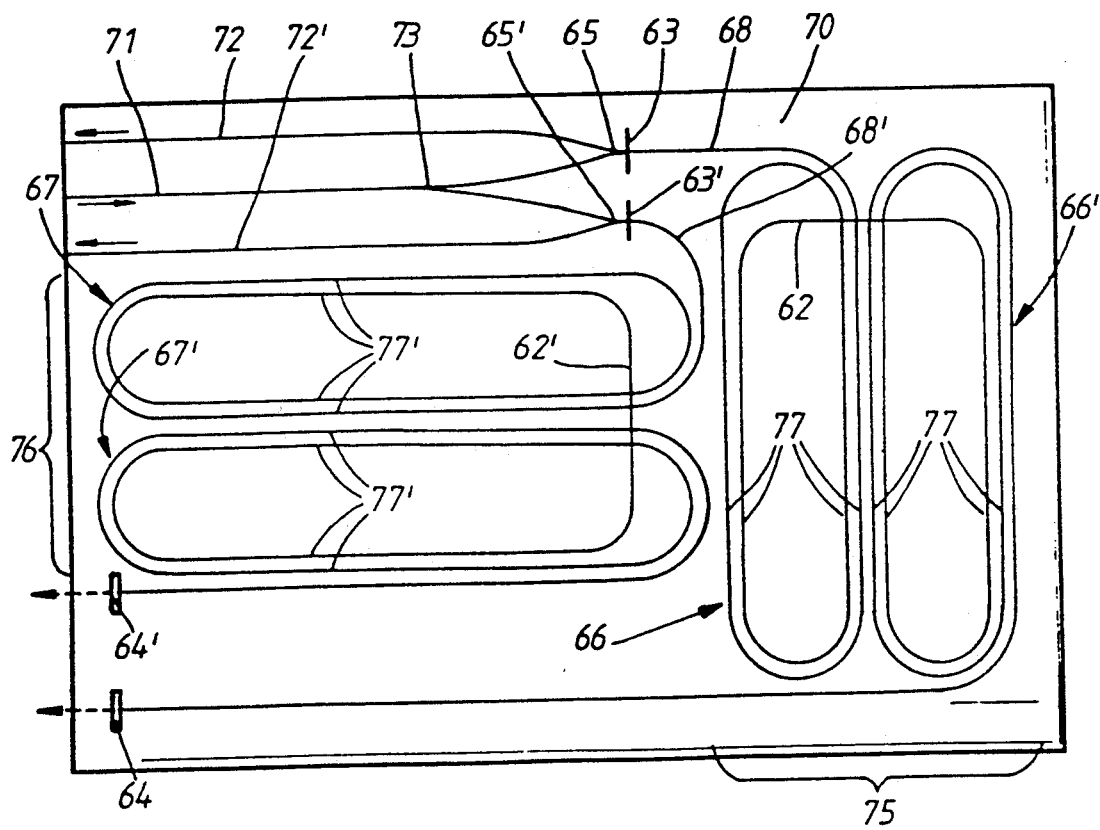
FIG. 6 is a fifth embodiment of an integrated-optics extension interferometer, and specifically in the form of a Fabry-Perot interferometer, but in double arrangement.

In the illustrative embodiment shown in FIG. 6, an integrated-optics extension interferometer according to Fabry-Perot is exemplified in reflection operation (solid lines). However, the interferometer shown in that figure is designed in double-beam construction with two resonators 75 and 76 which are disposed in parallel in terms of optical function and of which the one resonator 75 serves for the measurement and the other 76 for the temperature compensation. As stated, a Fabry-Perot interferometer also functions with only a single beam channel. In this case, the latter actually represents a resonator, which can be detuned or brought out of resonance by a length alteration by fractions of a wavelength. By suitable, known evaluation processes which are of no further interest here, the number of passages through resonance can or must be counted in the event of an alteration to the length of the resonator. Thus also, the direction of the traverse of the respective resonance positions can or must be detected, so that counting can take place with the correct sign upwards or downwards in a similar way to the direction of the length alteration. With a suitable supplementing of the signal evaluation, which is likewise known and does not need to be explained in greater detail at this point, even small fractions of a wavelength can be reliably detected both with the single and also with the double Fabry-Perot interferometer. If only a single resonator were to be integrated in the baseplate, extensions or compressions caused by thermal effects would also be measured by interferometry. In order to avoid this, when using such a single extension interferometer it would be necessary to carry out a progressive temperature measurement and to calculate from the measurement result obtained by interferometry the extension or compression caused by thermal effects. In order to avoid this, in the extension interferometer shown in FIG. 6, as stated, two resonators 75 and 76 are provided, of which the one resonator 76 serves for the temperature compensation. In these circumstances, only the extension difference of the measurement resonator 75 as compared with the compensation resonator 76 is detected.

Of the waveguides integrated into the base plate 70, an entrance portion 71 extends to the edge of the baseplate and is there connected in a light-conducting manner to an entrance optical fiber supplying primary light from a laser light source. However, the laser light source is not shown in FIG. 6. Via a Y-shaped branching 73, the waveguide disposed on the entrance side is split up. Furthermore, two further portions, the exit portions 72, 72', are likewise passed to the edge of the baseplate. In each instance a split waveguide coming from the entrance portion and in each instance one of the two exit portions 72, 72' are combined via a respective Y divider 65, 65' to form a common waveguide 68, 68'. A respective one of the resonators 75, 76 is optically disposed downstream of this common waveguide 68, 68'. Each one of these resonators is formed from a partially transmitting mirror 63, 63', which is integrated into the baseplate and which stands orthogonally to the wave guide 68, 68'. An integrated resonator waveguide and an end mirror 64, 64' is disposed at the other end of the resonator waveguide.

The waveguides respectively forming a resonator are disposed in a plurality of loops with mutually parallel oriented straight active partial sections 77, 77' and intermediate arcuate deflecting sections. In this case, a coupling-free mutual minimum spacing of all straight active partial sections and deflecting sections of the resonator-forming, integrated waveguide is observed at all locations, both within each individual resonator and also between the two resonators 75 and 76 respectively. The waveguides of the two resonators 75, 76 are furthermore of the same length as one another, in order to achieve equal path length alterations in both resonators in the event of extensions or compressions caused by thermal effects. In order that the resonator 76 serving for the temperature compensation should behave in an extension-metrologically neutral manner, the straight active partial sections 77 of the resonator 75 serving for the measurement are disposed orthogonally to the straight active partial sections 77' of the resonator 76 serving for the temperature compensation.

For the sake of completeness, it should be mentioned that the Fabry-Perot interferometer according to FIG. 6 can be designed not only as in the embodiment with reflection operation, shown in solid lines, but also for transmission operation. This embodiment is indicated in broken lines in FIG. 6. In this modified embodiment, the exits would have to be disposed at the bottom, on the left of the end mirrors 64, 64'. In this case, the end mirrors would have to be designed to be partially transmitting. On account of the exits fitted, in the transmission variant, to the resonators 75 and 76 respectively at the end surface, the exit portions 72, 72' disposed at the top in FIG. 6 as well as the two Y dividers 65, 65' would naturally be dispensed with.

In the case of the resonators 75 and 76, an arrangement or accommodation of the waveguides which is modified as compared with the illustrative embodiment according to FIG. 5 is selected, which does indeed include crossovers of waveguides, but which, in spite of a large number of active partial sections, keeps the number of crossover positions of waveguides small. In specific terms, in this case the loops of the measuring resonator 75 and those of the compensating resonator 76 are disposed in each instance in the form of two single oval spirals 66 and 66', or 67, 67', in which a respective waveguide partial section 62 or 62' is passed from the innermost active partial section 77 or 77' to a region situated outside the oval spiral. In this case, only a number of crossing positions which corresponds to the number of windings of the spiral and which is tolerable without further ado occurs.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A double-beam interferometer formed using integrated-optics technology comprising:
    a baseplate having waveguides integrated thereon;
    an entrance optical fiber supplying primary light from a laser light source, said integrated waveguides having an entrance portion extending to an edge of the baseplate and connecting in a light-conducting manner to the entrance optical fiber;
    an exit optical fiber conducting interference light away from the baseplate to a detecting device, at least one further exit portion of said integrated waveguides extending to an edge of the baseplate and connecting in a light-conducting manner to the exit optical fiber;
    an integrated light splitting device disposed downstream of said entrance portion of the integrated waveguide for splitting an injected primary light onto a reference arm and a measuring arm of waveguides;
    an integrated light coupler for combining light from the reference arm and from the measuring arm, said coupler merging into the at least one exit portion;
    wherein the portion of the waveguide forming the reference arm and the portion forming the measuring arm are both integrated over their entire length in the baseplate, said length of the reference arm corresponding to said length of the measuring arm;
    wherein at least that portion of the waveguide forming the measuring arm is disposed in a plurality of loops with mutually parallel oriented straight active partial sections and intermediate deflecting sections, in which a coupling-free mutual minimum spacing of all straight active partial sections and deflecting sections forming the measuring arm is provided; and
    wherein the waveguide forming the reference arm is at least one of designed and disposed in the baseplate in such a manner that upon extension of the baseplate in a direction of the straight active partial sections of the measuring arm, said reference arm operates in an extension-metrologically neutral manner.

2. An interferometer of the Fabry-Perot type formed using integrated-optics technology, comprising:
    a baseplate having waveguides integrated therein;
    an entrance optical fiber supplying primary light from a laser light source, said integrated waveguides having an entrance portion extending to an edge of the baseplate and connecting in a light-conducting manner to the entrance optical fiber;
    an exit optical fiber conducting interference light away from the baseplate to a detecting device, at least one further exit portion of said integrated waveguides extending to an edge of the baseplate and connecting in a light-conducting manner to the exit optical fiber;
    a Y-shaped combining element combining the entrance portion and the exit portion into a common waveguide;
    a resonator optically disposed downstream of the common waveguide of the combining element, said resonator being formed from a partially transmitting mirror which is integrated into the baseplate and which stands orthogonally to the waveguide and an end mirror disposed at the other end of the resonator waveguide;
    wherein the resonator waveguide is disposed in a plurality of loops with mutually parallel oriented straight active partial sections and intermediate deflecting sections, in which a coupling-free mutual minimum spacing of all straight active partial sections and deflecting sections of the integrated waveguide forming the resonator is provided.

3. An interferometer according to claim 2, wherein two resonators with resonator waveguides of mutually equal length are integrated into the baseplate, in which the resonator waveguides of both resonators are disposed in a plurality of loops with mutually parallel oriented straight active partial sections and intermediate deflecting sections in the baseplate and a coupling-free mutual minimum spacing of all straight active partial sections and deflecting sections is provided both within each individual resonator and also between the two resonators; and
    wherein the straight active partial sections of the one resonator are disposed in a direction behaving in an extension-metrologically neutral manner in relation to the direction of the straight active partial sections of the other resonator, preferably orthogonally to them in the baseplate.

4. An interferometer according to claim 1, wherein the reference arm is also disposed in a plurality of loops with mutually parallel oriented straight active partial sections and intermediate deflecting sections in a length conforming to the length of the measuring arm, in which the straight active partial sections of the reference arm are disposed in a direction behaving in an extension-metrologically neutral manner in relation to the direction of the straight active partial sections of the measuring arm, preferably orthogonally to them in the baseplate and in which a coupling-free mutual minimum spacing of the straight active partial sections and deflecting section of the integrated waveguide forming the reference arm in relation to one another and in relation to the straight active partial sections and deflecting sections of the measuring arm is provided.

5. An interferometer according to claim 1, wherein the deflecting sections between two successively following straight active partial sections within the integrated waveguide forming the measuring arm or within that forming the reference arm are respectively formed by a semicircular arcuate piece or by a pair of quadrant-shaped arcuate pieces, disposed in mirror image, with a straight connecting piece disposed therebetween.

6. An interferometer according to claim 4, wherein the deflecting sections between two successively following straight active partial sections within the integrated waveguide forming the measuring arm or within that forming the reference arm are respectively formed by a semicircular arcuate piece or by a pair of quadrant-shaped arcuate pieces, disposed in mirror image, with a straight connecting piece disposed therebetween.

7. An interferometer according to claim 1, wherein the deflecting sections between two successively following straight active partial sections within the integrated waveguide forming the measuring arm or within that forming the reference arm are respectively formed by a connecting piece which extends rectilinearly and which adjoins orthogonally with a sharp edge onto the respective active partial sections and by deflecting mirrors disposed at each of the two thus formed corners of waveguide sections, wherein the deflecting mirrors are in turn formed by the reflecting, preferably totally reflecting lateral surface of a respective slot incorporated into the baseplate orthogonally to the glass surface and at a 45° angle to the combining active partial or connecting sections.

8. An interferometer according to claim 4, wherein the deflecting sections between two successively following straight active partial sections within the integrated waveguide forming the measuring arm or within that forming the reference arm are respectively formed by a connecting piece which extends rectilinearly and which adjoins orthogonally with a sharp edge onto the respective active partial sections and by deflecting mirrors disposed at each of the two thus formed corners of waveguide sections, wherein the deflecting mirrors are in turn formed by the reflecting, preferably totally reflecting lateral surface of a respective slot incorporated into the baseplate orthogonally to the glass surface and at a 45° angle to the combining active partial or connecting sections.

9. An interferometer according to claim 5, wherein the loops, composed of straight active partial sections and circular-arcuate deflecting sections of the waveguide forming the measuring arm and/or of that forming the reference arm are disposed in the form of at least one oval double spiral, in which a waveguide, extending to and fro in a U shape and the parallel limb portions of which merge into one another via an end loop, is disposed so as to be wound in each instance in an oval spiral in which a waveguide partial section extends from the outermost active partial section of the one double spiral without crossover to the adjacent double spiral.

10. An interferometer according to claim 5, wherein the loops, composed of straight active partial sections and circular-arcuate deflecting sections of the waveguide forming the measuring arm and/or of that forming the reference arm or one of the resonators are disposed in the form of at least one oval spiral, in which a waveguide partial section extends from the innermost active partial section, crossing the other active partial sections of the one side of the oval spiral, to a region situated outside the oval spiral.

11. An interferometer according to claim 1, wherein with a design of the interferometer as a Michelson interferometer, the light splitting device and the light coupler are structurally combined in a single waveguide configuration, and specifically preferably in a so-called 3×3 directional coupler with three waveguides passed side-by-side at coupling spacing over a defined length, in which the central, blunt-ended waveguide of the 3×3 directional coupler represents the entrance portion and the two other waveguides of the 3×3 directional coupler merge on the one hand into the measuring arm provided at the end surface with a reflector or into the reference arm of the waveguides, provided at the end surface with a reflector, and on the other hand merge into the exit portions, in which at the two exit portions two interference signals which are phase-shifted preferably by 120° are present.

12. An interferometer according to claim 4, wherein with a design of the interferometer as a Michelson interferometer, the light splitting device and the light coupler are structurally combined in a single waveguide configuration, and specifically preferably in a so-called 3×3 directional coupler with three waveguides passed side-by-side at coupling spacing over a defined length, in which the central, blunt-ended waveguide of the 3×3 directional coupler represents the entrance portion and the two other waveguides of the 3×3 directional coupler merge on the one hand into the measuring arm provided at the end surface with a reflector or into the reference arm of the waveguides, provided at the end surface with a reflector, and on the other hand merge into the exit portions, in which at the two exit portions two interference signals which are phase-shifted preferably by 120° are present.

13. An interferometer according to claim 1, wherein with a design of the interferometer as a Mach-Zehnder interferometer, the light-splitting device is designed in the form of a branching of a waveguide, in which one of the two branching-off waveguides merges into the measuring arm and the other merges into the reference arm and in that the light coupler combining the light from the measuring arm and from the reference arm is designed in the form of a directional coupler, preferably in the form of a so-called 3×3 directional coupler with three waveguides passed side-by-side at coupling spacing over a defined length, in which the central blunt-ended waveguide of the 3×3 directional coupler represents one of three exit portions and the two other waveguides, situated on the outside of the 3×3 directional coupler, merge on the one hand into the measuring arm or into the reference arm of the waveguides and on the other hand merge into further exit portions, in which at the in total three exit portions three interference signals which are phase-shifted preferably by 120° are present.

14. An interferometer according to claim 4, wherein with a design of the interferometer as a Mach-Zehnder interferometer, the light-splitting device is designed in the form of a branching of a waveguide, in which one of the two branching-off waveguides merges into the measuring arm and the other merges into the reference arm and in that the light coupler combining the light from the measuring arm and from the reference arm is designed in the form of a directional coupler, preferably in the form of a so-called 3×3 directional coupler with three waveguides passed side-by-side at coupling spacing over a defined length, in which the central, blunt-ended waveguide of the 3×3 directional coupler represents one of three exit portions and the two other waveguides, situated on the outside of the 3×3 directional coupler, merge on the one hand into the measuring arm or into the reference arm of the waveguides and on the other hand merge into further exit portions, in which at the in total three exit portions three interference signals which are phase-shifted preferably by 120° are present.

15. An interferometer according to claim 1, wherein said interferometer is used as an extension measuring element which can be applied to the surface of a mechanically stressed component in the manner of a wire strain gauge known per se, and which is subjected to the component deformation near the surface.

16. An interferometer according to claim 2, wherein said interferometer is used as an extension measuring element which can be applied to the surface of a mechanically stressed component in the manner of a wire strain gauge known per se, and which is subjected to the component deformation near the surface.

17. An interferometer according to claim 3, wherein said interferometer is used as an extension measuring element which can be applied to the surface of a mechanically stressed component in the manner of a wire strain gauge known per se, and which is subjected to the component deformation near the surface.

18. An interferometer according to claim 4, wherein said interferometer is used as an extension measuring element which can be applied to the surface of a mechanically stressed component in the manner of a wire strain gauge known per se, and which is subjected to the component deformation near the surface.

19. A double-beam interferometer formed using integrated-optics technology, comprising:
   a baseplate having waveguides integrated thereon;
   an entrance optical fiber supplying primary light from a laser light source, said integrated waveguides having an entrance portion extending to an edge of the baseplate and connecting in a light-conducting manner to the entrance optical fiber;
   an exit optical fiber conducting interference light away from the baseplate to a detecting device, at least one further exit portion of said integrated waveguides extending to an edge of the baseplate and connecting in a light-conducting manner to the exit optical fiber;
   an integrated light splitting device disposed downstream of said entrance portion of the integrated waveguide for splitting an injected primary light onto a reference arm and a measuring arm of waveguides;
   an integrated light coupler for combining light from the reference arm and from the measuring arm, said coupler merging into the at least one exit portion;
   wherein the portion of the waveguide forming the reference arm and the portion forming the measuring arm are both integrated over their entire length in the baseplate;
   wherein at least that portion of the waveguide forming the measuring arm is disposed in a plurality of loops with mutually parallel oriented straight active partial sections and intermediate deflecting sections, in which a coupling-free mutual minimum spacing of all straight active partial sections and deflecting sections forming the measuring arm is provided;
   wherein the waveguide forming the reference arm is at least one of designed and disposed in the baseplate in such a manner that upon extension of the base plate in a direction of the straight active partial sections of the measuring arm, said reference arm operates in an extension-metrologically neutral manner; and
   wherein the reference arm is also disposed in a plurality of loops with mutually parallel oriented straight active partial sections and intermediate deflecting sections in a length conforming to the length of the measuring arm, in which the straight active partial sections of the reference arm are disposed in a direction behaving in an extension-metrologically neutral manner in relation to the direction of the straight active partial sections of the measuring arm, preferably orthogonally to them in the baseplate and in which a coupling-free mutual minimum spacing of the straight active partial sections and deflecting sections of the integrated waveguide forming the reference arm in relation to one another and in relation to the straight active partial sections and deflecting sections of the measuring arm is provided.

20. An interferometer of the Fabry-Perot type formed using integrated-optics technology, comprising:
   a baseplate having with waveguides integrated therein;
   an entrance optical fiber supplying primary light from a laser light source, said integrated waveguides having an entrance portion extending to an edge of the baseplate and connecting in a light-conducting manner to the entrance optical fiber;
   an exit optical fiber conducting interference light away from the baseplate to a detecting device, at least one further exit portion of said integrated waveguides extending to an edge of the baseplate and connecting in a light-conducting manner to the exit optical fiber;
   a Y-shaped combining element combining the entrance portion and the exit portion into a common waveguide;
   a resonator optically disposed downstream of the common waveguide of the combining element, said resonator being formed from a partially transmitting mirror which is integrated into the baseplate and which stands orthogonally to the waveguide and an end mirror disposed at the other end of the resonator waveguide;
   wherein the resonator waveguide is disposed in a plurality of loops with mutually parallel oriented straight active partial sections and intermediate deflecting sections, in which a coupling-free mutual minimum spacing of all straight active partial sections and deflecting sections of the integrated waveguide forming the resonator is provided;
   wherein two resonators with resonator waveguides of mutually equal length are integrated into the baseplate, in which the resonator waveguides of both resonators are disposed in a plurality of loops with mutually parallel oriented straight active partial sections and intermediate deflecting sections in the baseplate and a coupling-free mutual minimum spacing of all straight active partial sections and deflecting sections is provided both within each individual resonator and also between the two resonators; and wherein the straight active partial sections of the one resonator are disposed in a direction behaving in an extension-metrologically neutral manner in relation to the direction of the straight active partial sections of the other resonator, preferably orthogonally to them in the baseplate.

21. A double-beam interferometer formed using integrated-optics technology, comprising:

a baseplate having waveguides integrated thereon;

an entrance optical fiber supplying primary light from a laser light source, said integrated waveguides having an entrance portion extending to an edge of the baseplate and connecting in a light-conducting manner to the entrance optical fiber;

an exit optical fiber conducting interference light away from the baseplate to a detecting device, at least one further exit portion of said integrated waveguides extending to an edge of the baseplate and connecting in a light-conducting manner to the exit optical fiber;

an integrated light splitting device disposed downstream of said entrance portion of the integrated waveguide for splitting an injected primary light onto a reference arm and a measuring arm of waveguides;

an integrated light coupler for combining light from the reference arm and from the measuring arm, said coupler merging into the at least one exit portion;

wherein the portion of the waveguide forming the reference arm and the portion forming the measuring arm are both integrated over their entire length in the baseplate;

wherein at least that portion of the waveguide forming the measuring arm is disposed in a plurality of loops with mutually parallel oriented straight active partial sections and intermediate deflecting sections, in which a coupling-free mutual minimum spacing of all straight active partial sections and deflecting sections forming the measuring arm is provided;

wherein the waveguide forming the reference arm is at least one of designed and disposed in the baseplate in such a manner that upon extension of the baseplate in a direction of the straight active partial sections of the measuring arm, said reference arm operates in an extension-metrologically neutral manner;

wherein the reference arm is also disposed in a plurality of loops with mutually parallel oriented straight active partial sections and intermediate deflecting sections in a length conforming to the length of the measuring arm, in which the straight active partial sections of the reference arm are disposed in a direction behaving in an extension-metrologically neutral manner in relation to the direction of the straight active partial sections of the measuring arm, preferably orthogonally to them in the baseplase and in which a coupling-free mutual minimum spacing of the straight active partial sections and deflecting sections of the integrated waveguide forming the reference arm in relation to one another and in relation to the straight active partial sections and deflecting sections of the measuring arm is provided; and wherein the deflecting sections between two successively following straight active partial sections within the integrated waveguide forming the measuring arm or within that forming the reference arm are respectively formed by a semicircular arcuate piece or by a pair of quadrant-shaped arcuate pieces, disposed in mirror image, with a straight connecting piece disposed therebetween.

22. A double-beam interferometer formed using integrated-optics technology, comprising:

a baseplate having waveguides integrated thereon;

an entrance optical fiber supplying primary light from a laser light source, said integrated waveguides having an entrance portion extending to an edge of the baseplate and connecting in a light-conducting manner to the entrance optical fiber, an exit optical fiber conducting interference light away from the baseplate to a detecting device, at least one further exit portion of said integrated waveguides extending to an edge of the baseplate and connecting in a light-conducting manner to the exit optical fiber;

an integrated light splitting device disposed downstream of said entrance portion of the integrated waveguide for splitting an injected primary light onto a reference arm and a measuring arm of waveguides;

an integrated light coupler for combining light from the reference arm and from the measuring arm, said coupler merging into the at least one exit portion;

wherein the portion of the waveguide forming the reference arm and the portion forming the measuring arm are both integrated over their entire length in the baseplate;

wherein at least that portion of the waveguide forming the measuring arm is disposed in a plurality of loops with mutually parallel oriented straight active partial sections and intermediate deflecting sections, in which a coupling-free mutual minimum spacing of all straight active partial sections and deflecting sections forming the measuring arm is provided;

wherein the waveguide forming the reference arm is at least one of designed and disposed in the baseplate in such a manner that upon extension of the baseplate in a direction of the straight active partial sections of the measuring arm, said reference arm operates in an extension-metrologically neutral manner;

wherein the reference arm is also disposed in a plurality of loops with mutually parallel oriented straight active partial sections and intermediate deflecting sections in a length conforming to the length of the measuring arm, in which the straight active partial sections of the reference arm are disposed in a direction behaving in an extension-metrologically neutral manner in relation to the direction of the straight active partial sections of the measuring arm, preferably orthogonally to them in the baseplate and in which a coupling-free mutual minimum spacing of the straight active partial sections and deflecting sections of the integrated waveguide forming the reference arm in relation to one another and in relation to the straight active partial sections and deflecting sections of the measuring arm is provided;

wherein the deflecting sections between two successively following straight active partial sections within the integrated waveguide forming the measuring arm or within that forming the reference arm are respectively formed by a semicircular arcuate piece or by a pair of quadrant-shaped arcuate pieces, disposed in mirror image, with a straight connecting piece disposed therebetween; and wherein the loops, composed of straight active partial sections and circular-arcuate deflecting sections of the waveguide forming the measuring arm and/or of that forming the reference arm are disposed in the form of at least one oval spiral, in which a waveguide partial section extends from the innermost active partial section, crossing the other active partial sections of the one side of the oval spiral, to a region situated outside the oval spiral.

23. An interferometer of the Fabry-Perot type formed using integrated-optics technology, comprising:

a baseplate having waveguides integrated therein;

an entrance optical fiber supplying primary light form a laser light source, said integrated waveguides having an entrance portion extending to an edge of the baseplate and connecting in a light-conducting manner to the entrance optical fiber;

an exit optical fiber conducting interference light away from the baseplate to a detecting device, at least one further exit portion of said integrated waveguides extending to an edge of the baseplate and connecting in a light-conducting manner to the exit optical fiber;

a Y-shaped combining element combining the entrance portion and the exit portion into a common waveguide;

a resonator optically disposed downstream of the common waveguide of the combining element, said resonator being formed from a partially transmitting mirror which is integrated into the baseplate and which stands orthogonally to the waveguide and an end mirror disposed at the other end of the resonator waveguide;

wherein the resonator waveguide is disposed in a plurality of loops with mutually parallel oriented straight active partial sections and intermediate deflecting sections, in which a coupling-free mutual minimum spacing of all straight active partial sections and deflecting sections of the integrated waveguide forming the resonator is provided;

wherein two resonators with resonator waveguides of mutually equal length are integrated into the baseplate, in which the resonator waveguides of both resonators are disposed in a plurality of loops with mutually parallel oriented straight active partial sections and intermediate deflecting sections in the baseplate and a coupling-free mutual minimum spacing of all straight active partial sections and deflecting sections is provided both within each individual resonator and also between the two resonators, wherein the straight active partial sections of the one resonator are disposed in a direction behaving in an extension-metrologically neutral manner in relation to the direction of the straight active partial sections of the other resonator, preferably orthogonally to them in the baseplate;

wherein the deflecting sections between two successively following straight active partial sections within the integrated waveguide forming the measuring arm or within that forming the reference arm are respectively formed by a semicircular arcuate piece or by a pair of quadrant-shaped arcuate pieces, disposed in mirror image, with a straight connecting, piece disposed therebetween; and wherein the loops, composed of straight active partial sections and intermediate deflecting sections of the waveguide forming the resonator are disposed in the form of at least one oval double spiral, in which a waveguide, extending to and fro in a U shape and the parallel limb portions of which merge into one another via an end loop, is disposed so as to be wound in each instance in an oval spiral, in which a waveguide partial section extends from the outermost active partial section of the one double spiral without crossover to the adjacent double spiral.

24. An interferometer of the Fabry-Perot type formed using integrated-optics technology, comprising:

a baseplate having with waveguides integrated therein;

an entrance optical fiber supplying primary light from a laser light source, said integrated waveguides having an entrance portion extending to an edge of the baseplate and connecting in a light-conducting manner to the entrance optical fiber;

an exit optical fiber conducting interference light away from the baseplate to a detecting device, at least one further exit portion of said integrated waveguides extending to an edge of the baseplate and connecting in a light-conducting manner to the exit optical fiber;

a Y-shaped combining element combining the entrance portion and the exit portion into a common waveguide;

a resonator optically disposed downstream of the common waveguide of the combining element, said resonator being formed from a partially transmitting mirror which is integrated into the baseplate and which stands orthogonally to the waveguide and an end mirror disposed at the other end of the resonator waveguide;

wherein the resonator waveguide is disposed in a plurality of loops with mutually parallel oriented straight active partial sections and intermediate deflecting sections, in which a coupling-free mutual minimum spacing of all straight active partial sections and deflecting sections of the integrated waveguide forming the resonator is provided;

wherein two resonators with resonator waveguides of mutually equal length are integrated into the baseplate, in which the resonator waveguides of both resonators are disposed in a plurality of loops with mutually parallel oriented straight active partial sections and intermediate deflecting sections in the baseplate and a coupling-free mutual minimum spacing of all straight active partial sections and deflecting sections is provided both within each individual resonator and also between the two resonators;

wherein the straight active partial sections of the one resonator are disposed in a direction behaving in an extension-metrologically neutral manner in relation to the direction of the straight active partial sections of the other resonator, preferably orthogonally to them in the baseplate;

wherein the deflecting sections between two successively following straight active partial sections within the integrated waveguide forming the measuring arm or within that forming the reference arm are respectively formed by a semicircular arcuate piece or by a pair of quadrant-shaped arcuate pieces, disposed in mirror image, with a straight connecting piece disposed therebetween; and wherein the loops, composed of straight active partial sections and intermediate deflecting sections of the waveguide forming the resonator are disposed in the form of at least one oval spiral, in which a waveguide partial sections extends from the innermost active partial section, crossing the other active partial sections of the one side of the oval spiral, to a region situated outside the oval spiral.

* * * * *